(12) United States Patent
Yokohata et al.

(10) Patent No.: US 8,250,932 B2
(45) Date of Patent: Aug. 28, 2012

(54) GAS METER AND GAS SECURITY SYSTEM

(75) Inventors: Mitsuo Yokohata, Osaka (JP);
Hirozumi Nakamura, Nara (JP);
Tadanori Shirasawa, Nara (JP); Kazuo Kubo, Hyogo (JP); Mitsuo Namba,
Tokyo (JP); Hisashi Saito, Tokyo (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 12/921,359

(22) PCT Filed: Feb. 24, 2009

(86) PCT No.: PCT/JP2009/000816
§ 371 (c)(1),
(2), (4) Date: Sep. 7, 2010

(87) PCT Pub. No.: WO2009/110192
PCT Pub. Date: Sep. 11, 2009

(65) Prior Publication Data
US 2011/0000310 A1    Jan. 6, 2011

(30) Foreign Application Priority Data

Mar. 7, 2008    (JP) ................ 2008-057352
Mar. 7, 2008    (JP) ................ 2008-057591
Mar. 7, 2008    (JP) ................ 2008-058762

(51) Int. Cl.
*G01F 1/20* (2006.01)
(52) U.S. Cl. .................................. 73/861.18
(58) Field of Classification Search .............. 73/195; 137/487.5, 315.06
See application file for complete search history.

(56) References Cited

U.S. PATENT DOCUMENTS

| 5,960,807 A * | 10/1999 | Reyman ................. 137/1 |
| 2004/0149334 A1 * | 8/2004 | McGill et al. ........... 137/315.06 |
| 2010/0170582 A1 * | 7/2010 | Koba et al. .............. 137/487.5 |

FOREIGN PATENT DOCUMENTS

| JP | 08-005398 | 1/1996 |
| JP | 2000-081348 A | 3/2000 |
| JP | 2002-074497 A | 3/2002 |
| JP | 2004-309365 A | 11/2004 |
| JP | 2005-018720 A | 1/2005 |
| JP | 2006-336880 A | 12/2006 |
| JP | 2008-026245 A | 2/2008 |

OTHER PUBLICATIONS

International Search Report for International Application No. PCT/JP2009/000816, dated Apr. 28, 2009, 2 pages.

* cited by examiner

*Primary Examiner* — Jewel V Thompson
(74) *Attorney, Agent, or Firm* — Brinks Hofer Gilson & Lione

(57) ABSTRACT

The present invention is intended to make it possible to set security functions as necessary depending on usage environment, etc. and to improve the security functions; a function setting section 1116 sets security function information received from the outside via a communication line as security functions regarding the user of gas. According to the set security function, in the case that the operation conditions of the security function are satisfied, a monitoring section 112 detects a problem during the use of gas and outputs a security signal to a control section 114. Based on the security signal from the monitoring section 112, the control section 114 shuts off the supply of gas in the case that a phenomenon satisfying an operation condition of the set function having been set has occurred.

12 Claims, 7 Drawing Sheets

GAS METER AND GAS SECURITY SYSTEM

TECHNICAL FIELD

The present invention relates to a gas meter for measuring gas usage flow rate and to a gas security system incorporating this gas meter.

BACKGROUND ART

Conventionally, a gas meter for measuring gas usage flow rate, equipped with security functions, for example, for shutting off a gas supply path when a problem has occurred during the use of gas, is available. As security functions, for example, a function for shutting off a gas supply path using a shutoff valve when a tremor not less than a predetermined seismic intensity has been detected by a seismoscope and a function for shutting off a gas supply path when the flow rate of gas has exceeded a predetermined value or when the usage time has exceeded a predetermined time are provided.

In addition, Patent document 1 discloses a gas meter control system that stops gas supply using a communication line for automatic meter reading or a prepaid card system when a usable amount of gas has been reached in order to supply an amount of gas corresponding to the payment of bill. Furthermore, Patent document 2 discloses a network system that automatically measures the usage amount of water, electricity, gas, etc. so as to be able to perform bill calculation, bill charging, water leakage check, transfer of electric leakage and gas leakage detection information, etc. Still further, Patent document 3 discloses a gas management system that shuts off the supply of gas using a prepaid card when the balance information of a gas bill has reached zero, thereby eliminating the need for meter reading and bill collection.

Patent document 1: Japanese Patent Application Laid-open Publication No. Hei 8-5398

Patent document 2: Japanese Patent Application Laid-open Publication No. 2005-18720

Patent document 3: Japanese Patent Application Laid-open Publication No. 2002-74497

PROBLEM TO BE SOLVED BY THE INVENTION

Gas security functions required are different depending on the environment of the installation site, such as a country or a region, of a gas meter and a gas appliance, the type and usage state of a gas appliance connected and used in a house or the like of each user. For example, in a country or a region wherein the possibility of the occurrence of earthquakes is almost zero, there is not much necessity for a shutoff function that acts when a tremor is felt. Furthermore, in the function for performing shutoff when a usage time has exceeded a predetermined time, it is preferable that a continuous usage time being used for a shutoff judgment should be made different depending on usage flow rate; however, in a fixed security function, it is difficult to change the function as necessary due to the type, the usage state, etc. of the gas appliance being used by each user.

For this reason, there is a request that security functions should be selectable for each user.

SUMMARY OF THE INVENTION

In consideration of the above-mentioned circumstances, the present invention is intended to provide a gas meter and a gas security system being capable of easily setting security functions as necessary depending on usage environment, etc., thereby being capable of improving the security functions.

MEANS FOR SOLVING PROBLEMS

A gas meter according to the present invention includes a flow rate measurement section for measuring a flow rate of gas flowing through a gas flow path; a flow rate computing section for calculating predetermined flow rate data based on flow rate measurement values measured by the above-mentioned flow rate measurement section; a function setting section for setting security functions regarding the use of gas; a monitoring section for monitoring problems during the use of gas according to security functions including a set function having been set by the above-mentioned function setting section; a control section for performing a processing of the security functions in the case that a problem is detected by the above-mentioned monitoring section; and a communication section for establishing communication with a monitoring center for managing a supply of gas based on the instructions of the above-mentioned control section, wherein the above-mentioned function setting section receives security function information transmitted from the above-mentioned monitoring center via the above-mentioned communication section and sets a predetermined security function based on the above-mentioned security function information, and the above-mentioned control section shuts off the supply of gas in the case that a phenomenon satisfying an operation condition of the set function having been set by the above-mentioned function setting section has occurred.

With this configuration, the security function information can be installed from the outside using a communication line, and a predetermined security function can be set based on the security function information transmitted from the monitoring center via the communication section; hence, a security function can be set as necessary depending on usage environment, etc., and in the case that a phenomenon corresponding to the set function has occurred, the supply of gas can be shut off. The communication line can be attained easily by using a system for automatically measuring the usage amount of gas by virtue of a communication function using a telephone line.

In addition, the above-mentioned gas meter according to the present invention includes a security function information storage section for storing the security function information received via the above-mentioned communication section, wherein the above-mentioned function setting section selects a desired security function information from a plurality of security function information stored in the above-mentioned security function information storage section.

With this configuration, the security function information being transmitted is stored, and a security function to be used can be selected depending on the state of an appliance being used, whereby improvement in the security functions can be attained.

Furthermore, the above-mentioned gas meter according to the present invention is characterized in that the above-mentioned function setting section includes, as the above-mentioned security function information, information according to which at least one of functions for detecting problems due to phenomena, such as excess of flow rate, excess of usage time, leakage detection, abnormal pressure, pulsation detection, operation of a seismoscope and operation of a warning device can be set.

With this configuration, it is possible to set a security function that is selected from among a plurality of security functions and is used to detect a problem including at least one of a plurality of phenomena and to perform processing.

Moreover, the present invention provides a gas security system including the gas meter set forth in any one of the above-mentioned paragraphs; and a monitoring center connected to the above-mentioned gas meter via a communication line to receive notices from the above-mentioned gas meter.

A gas meter according to the present invention includes a flow rate measurement section for measuring a flow rate of gas flowing through a gas flow path; a flow rate computing section for calculating predetermined flow rate data based on flow rate measurement values measured by the above-mentioned flow rate measurement section; a function setting section for setting security functions regarding the use of gas; a security function information storage section for storing security functions regarding the use of gas; a monitoring section for monitoring problems during the use of gas according to security functions including a set function having been set by the above-mentioned function setting section; a control section for performing a processing of the security functions in the case that a problem is detected by the above-mentioned monitoring section; and a communication section for establishing communication with a monitoring center for managing a supply of gas based on the instructions of the above-mentioned control section, wherein the above-mentioned function setting section receives a security function selection signal transmitted from the above-mentioned monitoring center via the above-mentioned communication section and selects a predetermined security function from the above-mentioned security function information storage section based on the above-mentioned security function selection signal and set the function, and the above-mentioned control section shuts off the supply of gas in the case that a phenomenon satisfying an operation condition of the set function having been set by the above-mentioned function setting section has occurred.

With this configuration, a predetermined security function can be set based on the security function information selection signal transmitted from the monitoring center via the communication section; hence, a security function can be set as necessary depending on usage environment, etc., and in the case that a phenomenon corresponding to the set function has occurred, the supply of gas can be shut off. The communication line can be attained easily by using a system for automatically measuring the usage amount of gas by virtue of a communication function utilizing a telephone line.

In addition, the above-mentioned gas meter according to the present invention is characterized in that the above-mentioned function setting section selects a desired security function information from a plurality of security function information stored beforehand in the above-mentioned security function information storage section.

With this configuration, numerous pieces of security function information (programs) are stored beforehand in the security function information storage section of the gas meter, and selection is performed from this security function information, whereby desired security function information can be changed easily.

Furthermore, the above-mentioned gas meter according to the present invention is characterized in that security function information can be received via the above-mentioned communication section, and that the above-mentioned function setting section selects a desired security function information from a plurality of security function information stored in the above-mentioned security function information storage section via the above-mentioned communication section based on the above-mentioned security function selection signal.

With this configuration, in addition to the security function information stored beforehand in the security function information storage section of the gas meter, security function information being transmitted is stored, and a security function to be used can be selected depending on the state of an appliance being used, whereby improvement in the security functions can be attained.

Furthermore, the above-mentioned gas meter according to the present invention is characterized in that the above-mentioned function setting section includes, as the above-mentioned security function information, information according to which at least one of functions for detecting problems due to phenomena, such as excess of flow rate, excess of usage time, leakage detection, abnormal pressure, pulsation detection, operation of a seismoscope and operation of a warning device can be set.

With this configuration, it is possible to set a security function that is selected from among a plurality of security functions and is used to detect a problem including at least one of a plurality of phenomena and to perform processing.

Moreover, the present invention provides a gas security system including the gas meter set forth in any one of the above-mentioned paragraphs; and a monitoring center connected to the above-mentioned gas meter via a communication line to receive notices from the above-mentioned gas meter.

A gas meter according to the present invention includes a flow rate measurement section for measuring a flow rate of gas flowing through a gas flow path; a flow rate computing section for calculating predetermined flow rate data based on flow rate measurement values measured by the above-mentioned flow rate measurement section; a function setting section for setting security functions regarding the use of gas; a security function information storage section for storing security function information regarding the use of gas; a monitoring section for monitoring problems during the use of gas according to security functions including a set function having been set by the above-mentioned function setting section; a control section for performing a processing of the security functions in the case that a problem is detected by the above-mentioned monitoring section; and a communication section for establishing communication with a terminal possessed by the user of gas, wherein the above-mentioned function setting section obtains a security function selection signal transmitted from the above-mentioned terminal via the above-mentioned communication section and selects a predetermined security function from the above-mentioned security function information storage section based on the above-mentioned security function selection signal and set the function, and the above-mentioned control section shuts off the supply of gas in the case that a phenomenon satisfying an operation condition of the set function having been set by the above-mentioned function setting section has occurred.

With this configuration, a predetermined security function can be set based on the security function information selection signal transmitted from the terminal of the user of gas via the communication section; hence, a security function can be set as necessary depending on usage environment, etc., and in the case that a phenomenon corresponding to the set function has occurred, the supply of gas can be shut off.

Furthermore, the above-mentioned gas meter according to the present invention is characterized in that the above-mentioned function setting section includes, as the above-mentioned security function information, information according to which at least one of functions for detecting problems due to phenomena, such as excess of flow rate, excess of usage time, leakage detection, abnormal pressure, pulsation detection, operation of a seismoscope and operation of a warning device can be set.

With this configuration, it is possible to set a security function that is selected from among a plurality of security functions and is used to detect a problem including at least one of a plurality of phenomena and to perform processing.

Moreover, the present invention provides a gas security system including the gas meter set forth in any one of the above-mentioned paragraphs; and a terminal connected to the above-mentioned gas meter via a network to transmit a security function selection signal corresponding to the security function selected by the user of gas from among a plurality of security functions regarding the use of gas to the above-mentioned gas meter.

EFFECTS OF THE INVENTION

The present invention can set security functions corresponding to usage environment, etc. using a communication line or a network, such as the Internet, and can provide a gas meter and a gas security system capable of improving the security functions.

Figure 1:
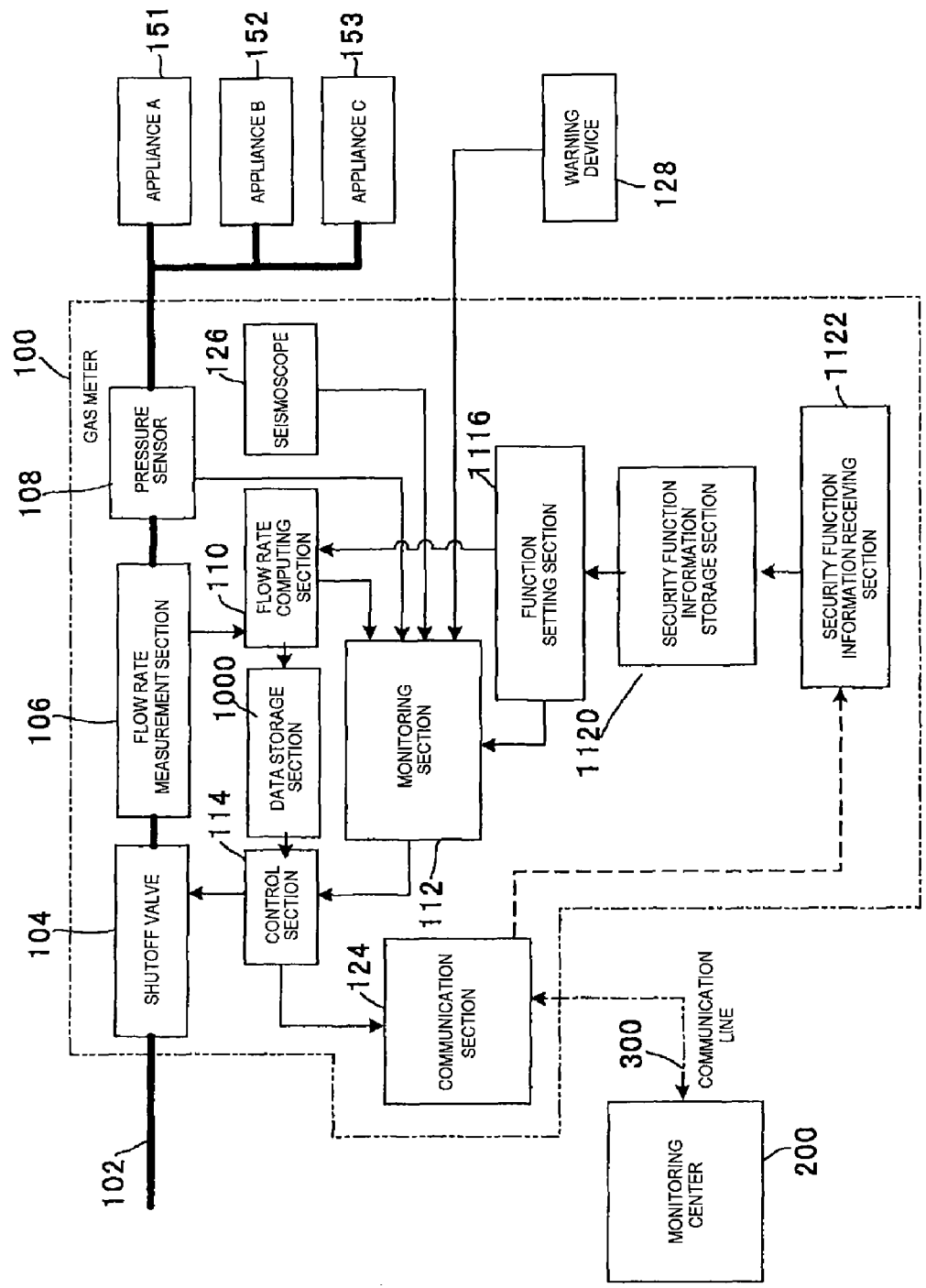
FIG. 1 is a block diagram showing the configurations of a gas meter and a gas security system according to Embodiment 1 of the present invention.

EXPLANATION OF LETTERS AND NUMERALS 100 gas meter
102 flow path
104 shutoff valve
106 flow rate measurement section
108 pressure sensor
110 flow rate computing section
112 monitoring section
114 control section
1116 function setting section
1120 security function information storage section
1122 security function information receiving section
124 communication section
126 seismoscope
128 warning device
151, 152, 153 gas appliance
200 monitoring center
300 communication line
400 server
500 network
600 terminal
1000 data storage section

DETAILED DESCRIPTION OF THE PREFERRED EMBODIMENTS

Embodiment 1

FIG. 1 is a block diagram showing the configurations of a gas meter and a gas security system according to Embodiment 1 of the present invention. The gas security system according to this embodiment is characterized in that security functions to be applied can be selected depending on usage environment based on security function programs (hereafter referred to as security function information) transmitted from a monitoring center via a communication line. In other words, this gas security system is configured so as to be equipped with a gas meter 100 serving as a flow rate measurement instrument and a monitoring center 200 for carrying out the monitoring of security functions regarding gas supply, the management of the usage state of each user, etc. The gas meter 100 is disposed outside or inside a building in which gas appliances are provided. The monitoring center 200 is installed in the management section of a gas company, a propane gas supplier or a company related to these, for example, and serves as an apparatus for centrally managing the gas meter 100 disposed in each building. The gas meter 100 is connected to the monitoring center 200 so as to communicate via a communication line 300, such as a wireless communication line, a telephone line or the Internet so that various signals and data can be transmitted therebetween.

The gas meter 100 is connected to a flow path 102 from which gas is supplied, and a shutoff valve 104, a flow rate measurement section 106 and a pressure sensor 108 are provided in this flow path 102. In addition, the gas meter 100 is equipped with a flow rate computing section 110, a monitoring section 112, a control section 114, a function setting section 1116, a security function information receiving section 1122, a security function information storage section 1120, a communication section 124 and a seismoscope 126. The functions of the flow rate computing section 110, the monitoring section 112, the control section 114 and the function setting section 1116 and the security function information storage section 1120 are attained using an computing processing unit formed of a processor, such as a microcomputer, and memory.

More than one various gas appliances: a gas appliance A 151, a gas appliance B 152 and a gas appliance C 153, such as a gas table, a fan heater, a water heater and a floor heating appliance, are connected to the downstream flow path of the gas meter 100. In addition, a warning device 128 for detecting gas leakage, carbon monoxide (CO), etc. and for issuing warnings of abnormal states is disposed in the vicinity of the installation sites of the gas appliances 151 to 153 and can communicate with the gas meter 100 via wireless or wired communication.

The flow rate measurement section 106 is used to measure the flow rate of the gas flowing through the flow path 102 and is formed of an ultrasonic flowmeter or the like. Although a configuration example in which an ultrasonic flowmeter is used as the flow rate measurement section 106 is described in this embodiment, other various flow rate measurement units, such as a fluidic flowmeter or a membrane flowmeter, may also be used, provided that the flow rate of gas can be measured. The flow rate measurement section 106 causes an ultrasonic wave to be transmitted and received alternately between ultrasonic wave transmitter/receiver units provided on the upstream and downstream sides of the flow path 102 at intervals of a constant time (for example, 2 seconds) and obtains the difference between the propagation time of the ultrasonic wave in the forward direction of the flow of a fluid and the propagation time thereof in the reverse direction, thereby measuring the flow velocity and the flow rate of the fluid to be measured.

The flow rate computing section 110 calculates the flow rate of gas used, the flow rate pattern corresponding to the time of the measurement thereof, etc. using a measured flow rate value output from the flow rate measurement section 106 and stores flow rate data regarding the flow rate and time, such as an integrated flow rate and a flow rate pattern, in a storage section provided in the inside or outside. Furthermore, the calculated flow rate data is output to the monitoring section 112. The flow rate measurement functions of the flow rate computing section 110 can be set selectively using the function setting section 1116 described later.

The pressure sensor 108 detects the pressure of the gas in the flow path 102 and outputs a pressure detection signal to the monitoring section 112. In addition, the seismoscope 126 detects the tremor of an earthquake and outputs a seismic signal to the monitoring section 112 in the case that the tremor of a seismic intensity not less than a predetermined level has been detected. Furthermore, the warning device 128 detects gas leakage from the flow path 102 or the gas appliances 151 to 153 and detects CO generated from the gas appliances 151 to 153 and then outputs an abnormality detection signal to the monitoring section 112 in the case that such gas leakage or CO leakage has been detected. The communication section 124 has a wired or wireless communication function and performs communication with the monitoring center 200 via the communication line 300 to transmit and receive signals and data.

The monitoring section 112 is used to monitor problems during the use of gas according to preset security functions. Based on the flow rate data from the flow rate computing section 110, the pressure detection signal from the pressure sensor 108, the seismic signal from the seismoscope 126, the abnormality detection signal from the warning device 128, etc. the monitoring section 112 detects problems during the use of gas and outputs a security signal to the control section 114 in the case that the operation conditions of the security functions are satisfied. The flow rate data from the flow rate computing section 110 is stored in a data storage section 1000 and output to the control section 114 at a predetermined timing. The security functions in the monitoring section 112 can be selectively set by the security function information storage section 1120 and the function setting section 1116 described later. The monitoring section 112 has a first monitoring operation for monitoring the security functions set by the function setting section 1116 and a second monitoring operation for monitoring the security functions not set by the function setting section 1116.

The security function information storage section 1120 stores information regarding various security functions to be attained in the monitoring section 112, and based on an input instruction from the security function information receiving section 1122, outputs the corresponding security function selection information to the function setting section 1116.

Based on the selection information output from the security function information receiving section 1122 via the security function information storage section 1120, the function setting section 1116 sets the measurement functions and the security functions of the gas meter and outputs function setting signals to the flow rate computing section 110 and the monitoring section 112. A configuration may be used in which programs for attaining various measurement functions are stored in the flow rate computing section 110, and according to a function setting signal from the function setting section 1116, the corresponding function is operated, or another configuration may also be used in which the program of a measurement function stored in the security function information storage section 1118 and selected is read and input from the function setting section 1116 to the flow rate computing section 110 and then operated. Furthermore, the programs for attaining various security functions are input from the monitoring center 200 to the security function information receiving section 1122 through the communication section 124 via the communication line 300. Moreover, a configuration may be used in which according to a function setting signal from the function setting section 1116 through the security function information storage section 1120, the corresponding function is operated, or another configuration may also be used in which the program of a security function stored once in the security function information storage section 1120 and selected is read and input from the function setting section 1116 to the monitoring section 112 and then operated.

The security function information receiving section 1122 has an interface function for inputting the measurement functions and the security functions to the security function information storage section 1120. The security function information receiving section 1122 can input the security function information transmitted from the monitoring center 200 via the communication line 300 and the communication section 124 to the security function information storage section 1120. In addition to remote instructions from the monitoring center 200, selection instructions can be input using various communication units, such as wireless communication and infrared communication. Still further, the security function information receiving section 1122 may be configured so as to have an operation input unit, for example, information processing equipment and terminals, such as operation buttons, a premise indicator and a personal computer, so that a user or a manager directly inputs instructions to input selection instructions. As described above, the security function information receiving section 1122 is not limited to the above-mentioned one, and the input for the function selection can be attained using various methods.

The control section 114 shuts off the supply of gas or issues a notice to the monitoring center 200 based on a security signal from the monitoring section 112. In the case of shutting off the supply of gas, the shutoff valve 104 is operated to shut off the flow path 102. In the case of issuing a notice, the communication section 124 is instructed to communicate with the monitoring center 200 via the communication line 300, and a notice regarding the occurrence of a problem due to an unset function is issued to the monitoring center 200. The communication section 124 issues the notice using, for example, a method of calling by using a telephone line as the communication line 300. At this time, the control section 114 shuts off the supply of gas in the case that a phenomenon satisfying an operation condition of a security function (set function) set in the function setting section 1116 has been detected by the first monitoring operation of the monitoring section 112. Furthermore, a warning notice may be issued to the monitoring center 200 in the case that a phenomenon satisfying an operation condition of a security function (unset function) not set in the function setting section 1116 has been detected by the second monitoring operation of the monitoring section 112. The notice to the monitoring center 200 is issued in the case that a problem that is judged using the second monitoring operation has occurred a predetermined number of times. This enhances the accuracy of detecting the situation of problem occurrence relating to gas supply and becomes data when the necessity of adding security functions is appealed to the user.

In the case that the monitoring center 200 has received a notice of a problem detected by the second monitoring operation from the gas meter 100, the monitoring center 200 issues, to the user, a notice indicating that problem detection using a security function not selected at present is done, thereby urging the user to set the corresponding security function. As the notice to the user, not only a notice via the communication line 300 but also a notice via various communication units can be used. Hence, improvement in the security functions is attained. Furthermore, the monitoring center 200 may transmit a setting instruction to the gas meter 100 via the communication line 300 to set an unset security function, the phenomenon corresponding to which has been detected.

Integration processes corresponding to various flow rate conditions are available as measurement functions, for example, the following functions. The results of these flow rate measurements can be utilized to reduce gas bill, etc.

(1) Ordinary integration function . . . integrating measured flow rate values (2) Integration function by time zone . . . integrating flow rate values by predetermined time zone and utilizing the integration to reduce or increase bill (3) Integration function by season . . . integrating flow rate values by predetermined season (by month, etc.) and utilizing the integration to reduce or increase bill (4) Integration function by appliance . . . integrating flow rate values by appliance used and utilizing the integration to reduce or increase bill (5) Integration function by function . . . integrating flow rate values by type of usage (heating, hot water supply, cooking, etc.) and utilizing the integration to reduce or increase bill In the case of performing integration by time zone and season, timer and calendar functions are necessary; in the case of performing integration by appliance and function, a meter having an appliance discrimination function and a usage type discrimination function is necessity as precondition.

At this time, in the case that the user does not perform function selection in particular, for example, in the case that an ordinary integration function is set to a default function as a default measurement mode and a function is selected, the selected measurement function becomes effective in addition to the ordinary integration function.

Functions for detecting phenomena of various problems due to excess of flow rate, excess of usage time, leakage detection, abnormal pressure, pulsation detection, operation of a seismoscope, operation of a warning device, etc. and for performing processes for security are available, and the following functions are available for the detection of problems, for example.

(1) Excess of total maximum flow rate . . . in the case that the total flow rate in a predetermined period has exceeded the standard flow rate (2) Excess of individual maximum flow rate . . . in the case that the change from the previous flow rate value is not more than a predetermined value each time the flow rate is measured (3) Excess of security duration . . . in the case that usage has been continued beyond the continuous usage allowable time stipulated by flow rate (4) Detection of pressure rise . . . in the case that it has been detected that the pressure value has risen by a predetermined value or more (5) Detection of pressure drop . . . in the case that it has been detected that the pressure value has lowered by a predetermined value or more (6) Detection of operation of a seismoscope . . . in the case that it has been detected that the seismoscope has operated due to the tremor of an earthquake or the like (7) Detection of minute leakage . . . in the case that a predetermined minute leakage flow rate has been detected for a predetermined number of days (8) Detection of pulsation . . . in the case that the change in flow rate or pressure not less than a predetermined value has been detected (9) Detection of operation of a warning device . . . in the case that it has been detected that various warning devices have operated At this time, in the case that the user does not perform function selection in particular, for example, in the case that the security function of excess of total maximum flow rate is set to a default function as a default security mode and a function is selected, the selected security function becomes effective. In addition, as described above, in the case that an alarm operation and a shutoff operation are available as processing operations to be performed when a problem has been detected by the security function and in the case that a problem has been detected by the selected and set function, the shutoff operation is performed.

Figure 2:
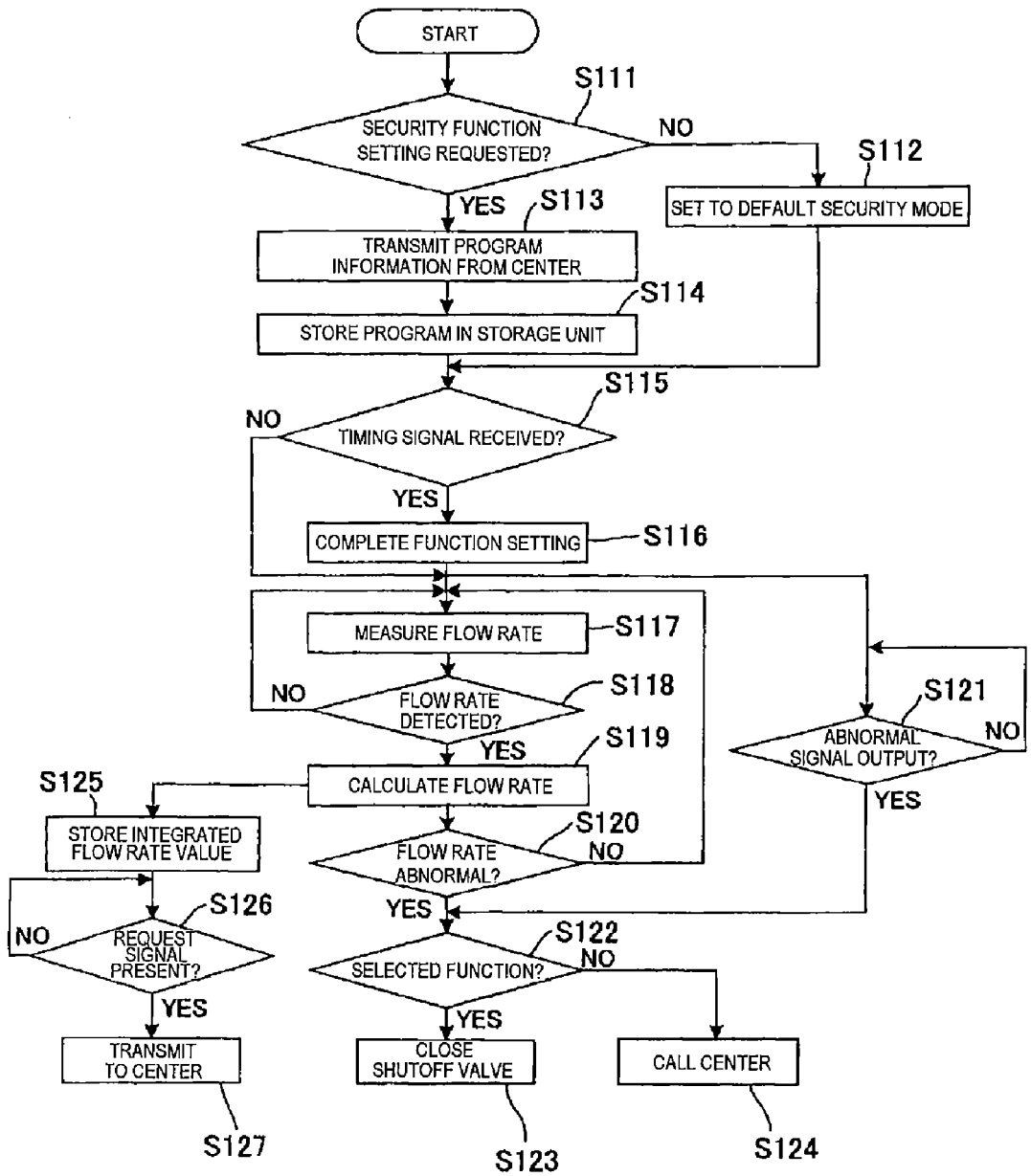
FIG. 2 is a flowchart showing a processing procedure during the operation of the gas meter and the gas security system according to Embodiment 1 of the present invention.

Next, the operations of the gas meter and the gas security system according to this embodiment will be described in detail. FIG. 2 is a flowchart showing a processing procedure during the operations of the gas meter and the gas security system according to this embodiment of the present invention.

First, the function setting section 1116 checks information received at the security function information receiving section 1122 and judges whether security function setting is requested (at step S111). In the case that security function setting is requested at step S111, security function information is transmitted from the monitoring center (at step S113), and the security function information is stored in the security function information storage section 1120 (at step S114). Furthermore, a judgment is made as to whether a timing signal indicating that the security function information was sent from the monitoring center via the communication line has been received (at step S115), and predetermined security function information from the above-mentioned security function information storage section 1120 is set (at step S116). On the other hand, in the case that security function setting is not requested at step S111 in which a judgment is made as to whether security function setting is requested, setting is done to the default security mode (for example, only the excess of total maximum flow rate) (at step S112), and the procedure advances to judgment step 115. Function setting is completed by performing the security function setting (at step S116). The timing signal may be a timing signal indicating that meter reading has been performed or may be a timing signal indicating that bill has been withdrawn.

Next, the flow rate of gas is measured by the flow rate measurement section 106 (at step S117). Then, a judgment is made as to whether the flow rate has been detected (at step S118), and in the case that the flow rate has been detected, the flow rate value is calculated using the flow rate computing section 110 (at step S119). In this flow rate value calculation, the integration of various flow rate values having been set as measurement functions is performed. Furthermore, in the case that no flow rate has been detected at step S118, the procedure returns to the flow rate measurement of step S117, and a similar process is repeated. Subsequently, after the flow rate value is calculated, the monitoring section 112 judges whether the flow rate is abnormal, such as the excess of flow rate (at step S120). In the case that the flow rate is abnormal at step S120, the procedure advances to the next step; in the case that there is no abnormality, the procedure returns to the flow rate measurement of step S117, and a similar process is repeated. Moreover, the monitoring section 112 judges whether an abnormal signal, such as a pressure detection signal from the pressure sensor 108, a seismic signal from the seismoscope 126 or an abnormality detection signal from the warning device 128, is output (at step S121). In the case that such an abnormal signal is output at step S121, the procedure advances to the next step; in the case that no abnormal signal is output, the procedure returns to the flow rate measurement of step S117, and a similar process is repeated.

Next, in the case that the flow rate is abnormal or in the case that an abnormal signal is output, the monitoring section 112 judges that a problem has occurred and outputs a security signal to the control section 114. When detecting a problem and outputting a security signal at this time, the monitoring section 112 judges not only the operation conditions of the above-mentioned selected and set security function but also the operation conditions of an unselected and unset security function; in the case that the operation conditions are satisfied, the monitoring section 112 transfers a security signal relating to the corresponding security function and information indicating the presence/absence of function setting to the control section 114. Then, the control section 114 judges whether the security function for which the security signal has been output is the above-mentioned set security function (at step S122). In the case that the security function is the set security function (at step S122), the shutoff valve 104 is operated and the flow path 102 is closed, thereby shutting off the supply of gas (the closing operation of the shutoff valve at step S123).

On the other hand, in the case that the security function is an unset security function at step S122, the control section 114 transmits a warning via the communication section 124 and gives the warning to the monitoring center 200 via the communication line 300 (at step S124). Hence, even with respect to a security function not selected by the user, in the case that a problem has been detected while the operation conditions are satisfied for a predetermined number of times, the monitoring center 200 can recognize the occurrence of the problem. In the case that the monitoring center 200 has received the notice of the occurrence of the problem from the gas meter 100, the monitoring center 200 issues, to the user, a notice indicating the occurrence of the problem due to an unselected security function, thereby reporting the necessity of the setting of the corresponding security function and urging improvement in the security functions.

On the other hand, at the flow rate value calculation step S119, integration of various flow rate values having been set as measurement functions is performed, and this integrated value is stored in the data storage section 1000 (at step S125). Then, the monitoring section 112 judges whether a signal requesting the transmission of the integrated flow rate value is present or absent (at step S126). Furthermore, in the case that the request signal is present, an instruction signal is output from the monitoring section 112 to the control center 4, the control section 114 reads the predetermined integrated flow rate value from the data storage section 1000 and transmits the value to the monitoring center 200 via the communication section 124 (at step S127). Then, the monitoring center 200 outputs a bill withdrawal signal, etc.

Still further, in the case that the signal requesting the transmission is not detected at step S126, the procedure returns to the judgment step S126 and a similar process is repeated.

With the above-mentioned embodiment, the security function information is installed as necessary via the communication line depending on usage environment, etc., and the installed security function information can be selected and set; in the case that a phenomenon corresponding to the set function has occurred, a security process for shutting off the supply of gas can be executed. With respect to an unset function, the occurrence of a problem due to the unset function can be recognized in the monitoring center by giving a notice to the monitoring center. In this case, it is possible, for example, to urge the user to set the corresponding security function, whereby improvement in the security functions can be attained.

It is possible that the security functions are set selectively from among a plurality of functions via the communication line depending on the area of use, installation location, usage state, usage flow rate, etc. Furthermore, it is also possible easily to update the security functions by version upgrade, for example, and to add new security functions via the communication line.

Moreover, accidents may occur in rare cases even in a state in which almost all the security functions are incorporated in the gas meter, the possibility of accident occurrence relating to gas supply is very low and the security is ensured. In such cases, advanced security functions for preventing accidents occurring on rare occasions can be used as options and installed via the communication line, and the version of the gas meter can be upgraded.

Still further, it is assumed that the security functions are not provided in some usage areas. In the case of such areas, there is a possibility that demand for enhancing the security functions is generated in accordance with future infrastructure improvement, change in the feeling of the user who emphasizes security, change in national policy, etc. As initial countermeasures therefor, it is possible that the security functions for preventing accident occurrence relating to gas supply are set selectively and billing is performed for the security functions, whereby the security of a gas supply system can be improved while the functions of the existing gas meter are enhanced.

In the above-mentioned gas meter, in the case that a phenomenon satisfying an operation condition of an unset function that is not set by the above-mentioned function setting section has occurred, the above-mentioned control section may issue a notice to the above-mentioned monitoring center via the above-mentioned communication section about the occurrence of a problem due to the unset function. With this configuration, with respect to the unset function, the occurrence of the problem due to the unset function can be recognized in the monitoring center by issuing a notice to the monitoring center. In this case, for example, the user is urged to set the corresponding security function; in the case that the security function is not available on the side of the gas meter, the function is installed via the communication line, whereby improvement in the security functions can be attained easily.

Furthermore, when the above-mentioned control section of the above-mentioned gas meter issues the notice about the occurrence of the problem due to the above-mentioned unset function, the notice may be issued in the case that a phenomenon satisfying an operation condition of the above-mentioned unset function has occurred a predetermined number of times. With this configuration, it is possible to improve the accuracy of detecting problem occurrence relating to gas supply.

Embodiment 2

Next, Embodiment 2 according to the present invention will be described.

Figure 3:
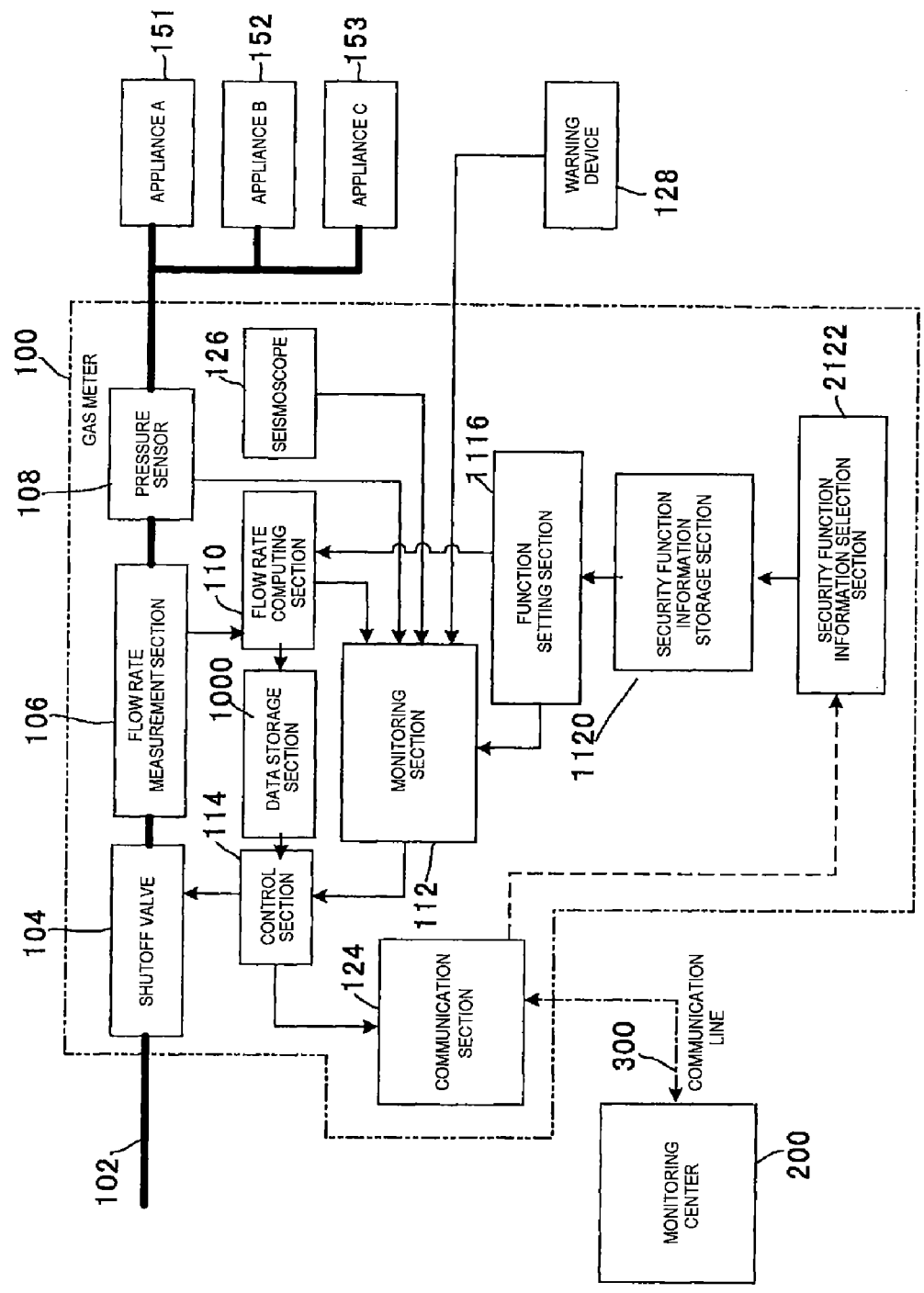
FIG. 3 is a block diagram showing the configurations of a gas meter and a gas security system according to Embodiment 2 of the present invention.

Since this embodiment as an apparatus includes many sections common to the above-mentioned Embodiment 1, the description thereof is simplified; FIG. 3 is a block diagram showing the configurations of a gas meter and a gas security system according to Embodiment of the present invention. The gas security system according to this embodiment is characterized in that security functions to be applied can be selected depending on usage environment based on security function selection signals transmitted from a monitoring center via a communication line. In other words, this gas security system, like the gas security system according to the above-mentioned Embodiment 1, is configured so as to be equipped with a gas meter 100 serving as a flow rate measurement instrument and a monitoring center 200 for carrying out the monitoring of security functions regarding gas supply, the management of the usage state of each user, etc. The gas meter 100 is disposed outside or inside a building in which gas appliances are provided. The monitoring center 200 is installed in the management section of a gas company, a propane gas supplier or a company related to these, for example, and serves as an apparatus for centrally managing the gas meter 100 disposed in each building. The gas meter 100 is connected to the monitoring center 200 so as to communicate via a communication line 300, such as a wireless communication line, a telephone line or the Internet so that various signals and data can be transmitted therebetween. As obvious in comparison with FIG. 1, there is a difference in that in this embodiment a security function information selection section 2122 is used instead of the security function information receiving section 1122 in the above-mentioned Embodiment 1.

The security function information selection section 2122 has an interface function for inputting selection instructions for the measurement functions and the security functions to the security function information storage section 1120. The security function information selection section 2122 can input the selection signals transmitted from the monitoring center 200 via the communication line 300 and the communication section 124 to the security function information storage section 1120. In addition to remote instructions from the monitoring center 200, selection instructions can be input using various communication units, such as wireless communication and infrared communication. Still further, the security function information selection section 2122 may be configured so as to have an operation input units, for example, information processing equipment and terminals, such as operation buttons, a premise indicator and a personal computer, so that a user or a manager directly inputs instructions to input selection instructions. As described above, the security function information selection section 2122 is not limited to the above-mentioned one, and the input for the function selection can be attained using various methods.

Figure 4:
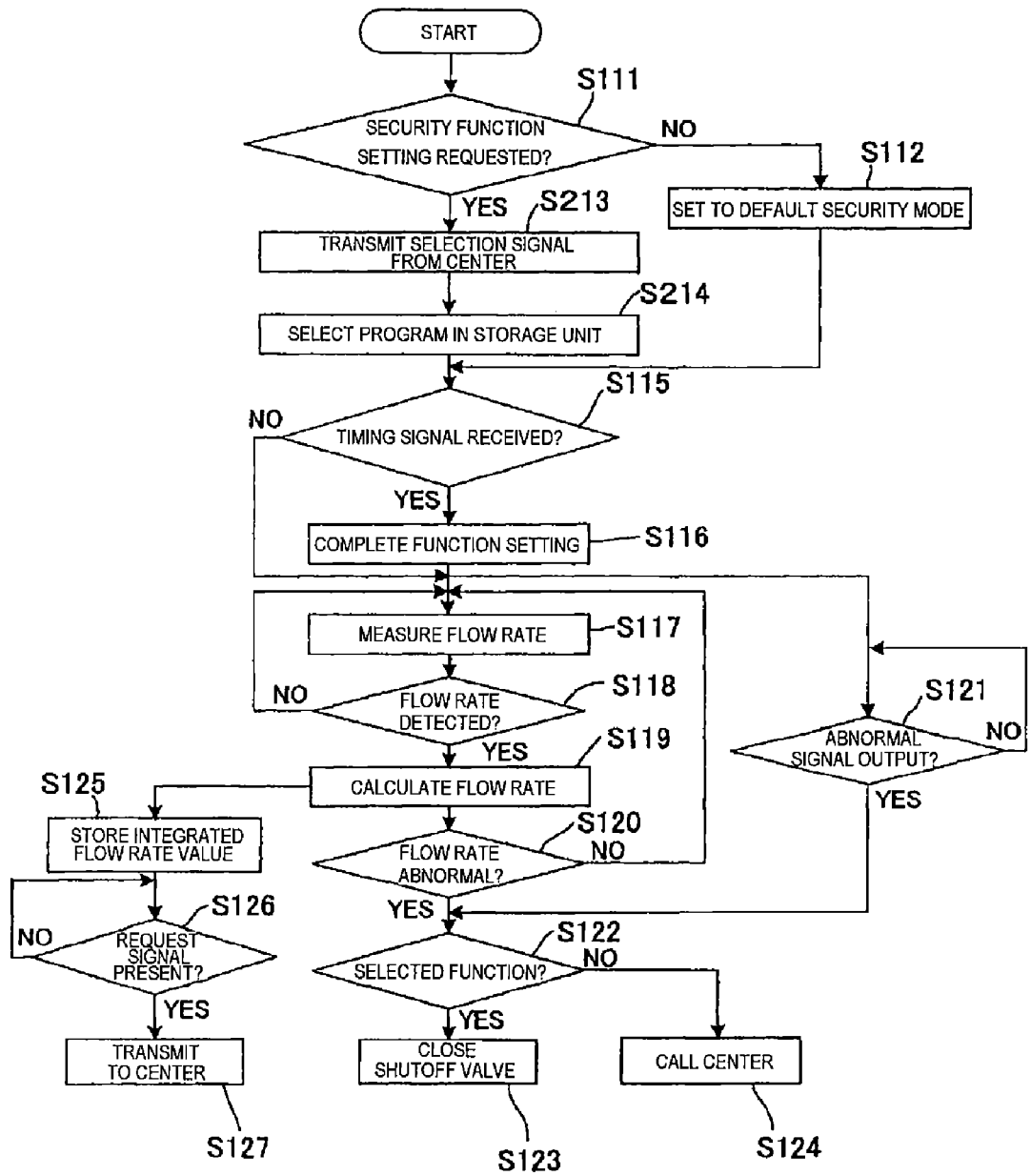
FIG. 4 is a flowchart showing a processing procedure during the operation of the gas meter and the gas security system according to Embodiment 2 of the present invention.

Next, the operations of the gas meter and the gas security system according to this embodiment will be described in detail. FIG. 4 is a flowchart showing a processing procedure during the operations of the gas meter and the gas security system according to this embodiment of the present invention.

First, the function setting section 1116 checks information received at the security function information selection section 2122 and judges whether security function setting is requested (at step S111). In the case that security function setting is requested at step S111, a security function selection signal is transmitted from the monitoring center via the communication line (at step S213), and predetermined security function information is selected from the security function information stored in the security function information storage section 1120 based on the security function selection signal (at step S214). Furthermore, a judgment is made as to whether a timing signal indicating that the security function information selection signal was sent from the monitoring center via the communication line has been received (at step S115), and the predetermined security function information from the above-mentioned security function information storage section 1120 is set (at step S116). On the other hand, in the case that security function setting is not requested at step S111 in which a judgment is made as to whether security function setting is requested, setting is done to the default security mode (for example, only the excess of total maximum flow rate) (at step S112), and the procedure advances to judgment step 115. Function setting is completed by performing the security function setting (at step S116). The timing signal may be a timing signal indicating that meter reading has been performed or may be a timing signal indicating that bill has been withdrawn; at step S115, a judgment as to whether the security function information setting is switched to valid or invalid is done according to this timing signal.

Next, the flow rate of gas is measured by the flow rate measurement section 106 (at step S117). Then, a judgment is made as to whether the flow rate has been detected (at step S118), and in the case that the flow rate has been detected, the flow rate value is calculated using the flow rate computing section 110 (at step S119). In this flow rate value calculation, the integration of various flow rate values having been set as measurement functions is performed. Furthermore, in the case that no flow rate has been detected at step S118, the procedure returns to the flow rate measurement at step S117, and a similar process is repeated. Subsequently, after the flow rate value is calculated, the monitoring section 112 judges whether the flow rate is abnormal, such as the excess of flow rate (at step S120). In the case that the flow rate is abnormal at step S120, the procedure advances to the next step; in the case that there is no abnormality, the procedure returns to the flow rate measurement at step S117, and a similar process is repeated. Moreover, the monitoring section 112 judges whether an abnormal signal, such as a pressure detection signal from the pressure sensor 108, a seismic signal from the seismoscope 126 or an abnormality detection signal from the warning device 128, is output (at step S121). In the case that such an abnormal signal is output at step S121, the procedure advances to the next step; in the case that no abnormal signal is output, the procedure returns to the flow rate measurement at step S117, and a similar process is repeated.

Next, in the case that the flow rate is abnormal or in the case that an abnormal signal is output, the monitoring section 112 judges that a problem has occurred and outputs a security signal to the control section 114. When detecting a problem and outputting a security signal at this time, the monitoring section 112 judges not only the operation conditions of the above-mentioned selected and set security functions but also the operation conditions of an unselected and unset security function; in the case that the operation conditions are satisfied, the monitoring section 112 transfers a security signal relating to the corresponding security function and information indicating the presence/absence of function setting to the control section 114. Then, the control section 114 judges whether the security function for which the security signal has been output is the above-mentioned set security function (at step S122). In the case that the security function is the set security function (at step S122), the shutoff valve 104 is operated and the flow path 102 is closed, thereby shutting off the supply of gas (the closing operation of the shutoff valve at step S123).

On the other hand, in the case that the security function is an unset security function at step S122, the control section 114 transmits a warning via the communication section 124 and gives the warning to the monitoring center 200 via the communication line 300 (at step S124). Hence, even with respect to a security function not selected by the user, in the case that a problem has been detected while operation conditions are satisfied for a predetermined number of times, the monitoring center 200 can recognize the occurrence of the problem. In the case that the monitoring center 200 has received the notice of the occurrence of the problem from the gas meter 100, the monitoring center 200 issues, to the user, a notice indicating the occurrence of the problem due to an unselected security function, thereby reporting the necessity of the setting of the corresponding security function and urging improvement in the security functions.

On the other hand, at the flow rate value calculation step S119, integration of various flow rate values having been set as measurement functions is performed, and this integrated value is stored in the data storage section 1000 (at step S125). Then, the monitoring section 112 judges whether a signal requesting the transmission of the integrated flow rate value is present or absent (at step S126). Furthermore, in the case that the request signal is present, an instruction signal is output from the monitoring section 112 to the control section 114, the control section 114 reads the predetermined integrated flow rate value from the data storage section 1000 and transmits the value to the monitoring center 200 via the communication section 124 (at step S127). Then, the monitoring center 200 outputs a bill withdrawal signal, etc.

Still further, in the case that the signal requesting the transmission is not detected at step S126, the procedure returns to the judgment step S126 and a similar process is repeated.

With the above-mentioned embodiment, from the security function information stored in the gas meter, based on the security function selection signal that is input as necessary via the communication line depending on usage environment, etc., security function information can be selected and set; in the case that a phenomenon corresponding to the set function has occurred, a security process for shutting off the supply of gas can be executed. With respect to an unset function, the occurrence of a problem due to the unset function can be recognized in the monitoring center by giving a notice to the monitoring center. In this case, it is possible, for example, to urge the user to set the corresponding security function, whereby improvement in the security functions can be attained.

It is possible that the security functions are set selectively from among a plurality of functions via the communication line depending on the area of use, installation location, usage state, usage flow rate, etc. Furthermore, it is also possible easily to update the security functions by version upgrade, for example, and to add new security functions via the communication line.

Moreover, accidents may occur in rare cases even in a state in which almost all the security functions are incorporated in the gas meter, the possibility of accident occurrence relating to gas supply is very low and the security is ensured. In such cases, advanced security functions for preventing accidents occurring on rare occasions may used as options and installed via the communication line; hence, the version of the gas meter can be upgraded.

Still further, it is assumed that the security functions are not provided in some usage areas. In the case of such areas, there is a possibility that demand for enhancing the security functions is generated in accordance with future infrastructure improvement, change in the feeling of the user who emphasizes security, change in national policy, etc. As initial countermeasures therefor, the security functions for preventing accident occurrence relating to gas supply are set selectively so that other security functions can be selected later according to the security function selection signals and so that billing is performed for the security functions, whereby the security of a gas supply system can be improved while the functions of the existing gas meter are enhanced.

In the above-mentioned gas meter, in the case that a phenomenon satisfying an operation condition of an unset function that is not set by the above-mentioned function setting section has occurred, the above-mentioned control section may issue a notice to the above-mentioned monitoring center via the above-mentioned communication section about the occurrence of a problem due to the unset function. With this configuration, with respect to the unset function, the occurrence of the problem due to the unset function can be recognized in the monitoring center by issuing a notice to the monitoring center. In this case, for example, the user is urged to set the corresponding security function, and the security function selection signal for selecting the security function stored in the gas meter is transmitted via the communication line, whereby improvement in the security functions can be attained easily. In addition, in the case that the security function is not available on the side of the gas meter, the function is installed via the communication line, whereby improvement in the security functions can also be attained.

Furthermore, the above-mentioned control section of the above-mentioned gas meter may issue the notice about the occurrence of the problem due to the above-mentioned unset function; when the notice is issued, the notice may be done in the case that a phenomenon satisfying an operation condition of the above-mentioned unset function has occurred a predetermined number of times. With this configuration, it is possible to improve the accuracy of detecting problem occurrence relating to gas supply.

Embodiment 3

Next, Embodiment 3 according to the present invention will be described.

Figure 5:
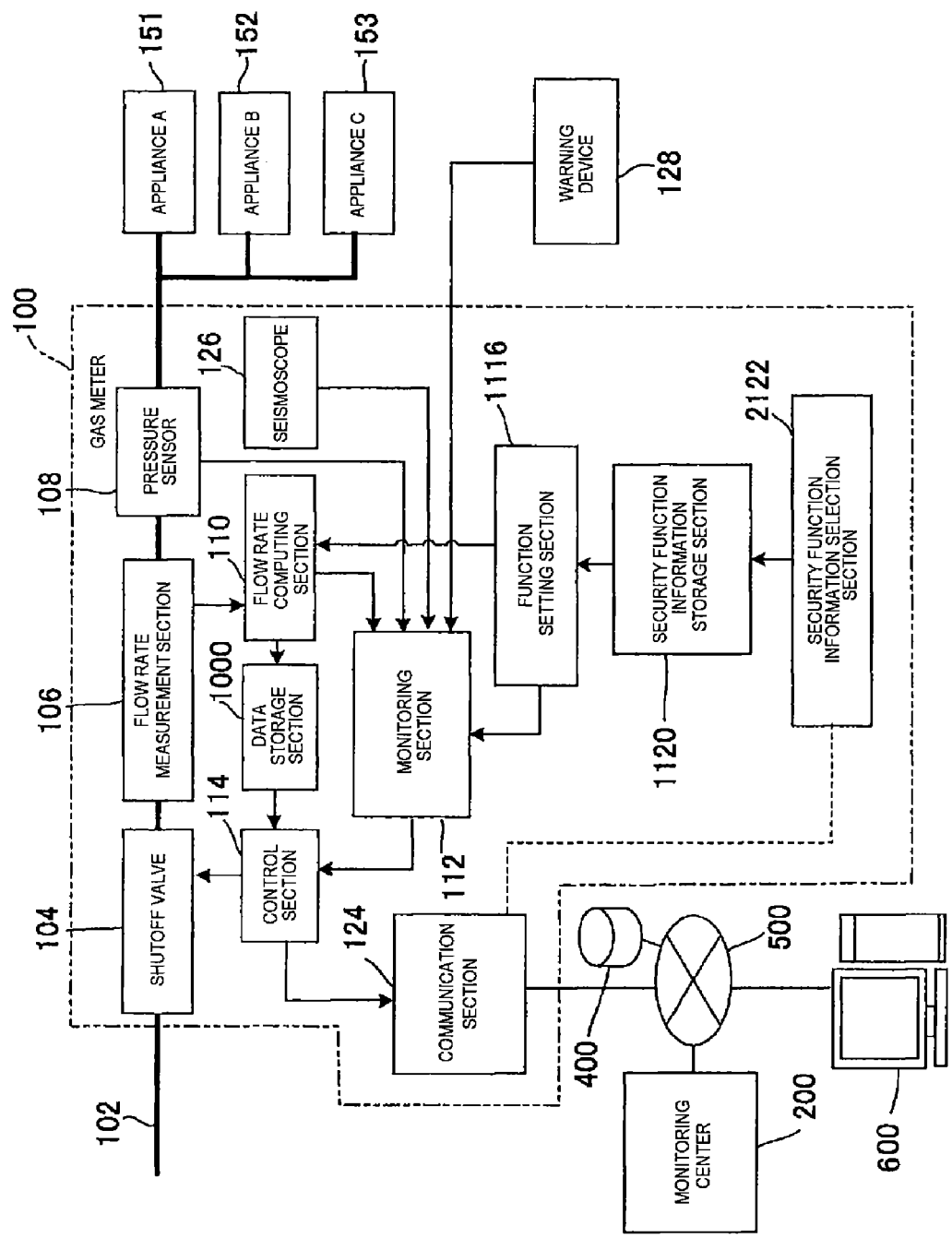
FIG. 5 is a block diagram showing the configurations of a gas meter and a gas security system according to Embodiment 3 of the present invention.

FIG. 5 is a block diagram showing the configurations of a gas meter and a gas security system according to Embodiment 3 of the present invention. In this embodiment, although the gas meter and the security system according to Embodiment 1 are almost similar to those according to Embodiment 2, the functions of the function setting section thereof are different. More specifically, the gas security system according to this embodiment is characterized in that security functions to be applied to a gas meter 100 can be selected depending on usage environment based on security function selection signals transmitted from a monitoring center 200 or a terminal 600 via a network 500, such as the Internet. In other words, this gas security system is configured so as to be equipped with the gas meter 100 serving as a flow rate measurement instrument, the monitoring center 200 for carrying out the monitoring of security functions regarding gas supply, the management of the usage state of each user, the setting of security functions, etc., the terminal 600 capable of setting security functions in the gas meter 100, and a server 400 capable of making it possible for the terminal 600 to set security functions.

The gas meter 100 is disposed outside or inside a building in which gas appliances are provided. The monitoring center 200 is installed in the management section of a gas company, a propane gas supplier or a company related to these, for example, and serves as an apparatus for centrally managing the gas meter 100 disposed in each building. The gas meter 100 is connected to the monitoring center 200 and the gas meter 100 is also connected to the terminal 600 so as to communicate via the network 500 so that various signals and data can be transmitted therebetween. The terminal 600 is a personal computer, a mobile phone, a PHS (Personal Handyphone System), a PDA (Personal Digital Assistant), etc. owned by the user. The server 400 is installed mainly in a communications company.

The gas meter 100 is connected to a flow path 102 from which gas is supplied, and a shutoff valve 104, a flow rate measurement section 106 and a pressure sensor 108 are provided in this flow path 102. In addition, the gas meter 100 is equipped with a flow rate computing section 110, a monitoring section 112, a control section 114, a function setting section 1116, a security function information selection section 2122, a security function information storage section 1120, a communication section 124 and a seismoscope 126. The functions of the flow rate computing section 110, the monitoring section 112, the control section 114 and the function setting section 1116 and the security function information storage section 1120 are attained using an computing processing unit formed of a processor, such as a microcomputer, and memory.

More than one various gas appliances: a gas appliance A 151, a gas appliance B 152 and a gas appliance C 153, such as a gas table, a fan heater, a water heater and a floor heating appliance, are connected to the downstream flow path of the gas meter 100. In addition, a warning device 128 for detecting gas leakage, carbon monoxide (CO), etc. and for issuing warnings of abnormal states is disposed in the vicinity of the installation sites of the gas appliances 151 to 153 and can communicate with the gas meter 100 via wireless or wired communication.

The flow rate measurement section 106 is used to measure the flow rate of the gas flowing through the flow path 102 and is formed of an ultrasonic flowmeter or the like. Although a configuration example in which an ultrasonic flowmeter is used as the flow rate measurement section 106 is described in this embodiment, other various flow rate measurement units, such as a fluidic flowmeter or a membrane flowmeter, may also be used, provided that the flow rate of gas can be measured. The flow rate measurement section 106 causes an ultrasonic wave to be transmitted and received alternately between ultrasonic wave transmitter/receiver units provided on the upstream and downstream sides of the flow path 102 at intervals of a constant time (for example, 2 seconds) and obtains the difference between the propagation time of the ultrasonic wave in the forward direction of the flow of a fluid and the propagation time thereof in the reverse direction, thereby measuring the flow velocity and the flow rate of the fluid to be measured.

The flow rate computing section 110 calculates the flow rate of gas used, the flow rate pattern corresponding to the time of the measurement thereof, etc. using a measured flow rate value output from the flow rate measurement section 106 and stores flow rate data regarding the flow rate and time, such as an integrated flow rate and a flow rate pattern, in a storage section provided in the inside or outside. Furthermore, the calculated flow rate data is output to the monitoring section 112. The flow rate measurement functions of the flow rate computing section 110 can be set selectively using the function setting section 1116 described later.

The pressure sensor 108 detects the pressure of the gas in the flow path 102 and outputs a pressure detection signal to the monitoring section 112. In addition, the seismoscope 126 detects the tremor of an earthquake and outputs a seismic signal to the monitoring section 112 in the case that the tremor of a seismic intensity not less than a predetermined level has been detected. Furthermore, the warning device 128 detects gas leakage from the flow path 102 or the gas appliances 151 to 153 and detects CO generated from the gas appliances 151 to 153 and then outputs an abnormality detection signal to the monitoring section 112 in the case that such gas leakage or CO leakage has been detected. The communication section 124 has a communication function for performing communication while being connected to the network 500 and performs communication with the monitoring center 200 or the terminal 600 via the network 500 to transmit and receive signals and data. A communication protocol, such as TCP/IP (Transmission Control Protocol/Internet Protocol), is used for the connection to the network 500.

The monitoring section 112 is used to monitor problems during the use of gas according to preset security functions. Based on the flow rate data from the flow rate computing section 110, the pressure detection signal from the pressure sensor 108, the seismic signal from the seismoscope 126, the abnormality detection signal from the warning device 128, etc. the monitoring section 112 detects problems during the use of gas and outputs a security signal to the control section 114 in the case that the operation conditions of the security functions are satisfied. The flow rate data from the flow rate computing section 110 is stored in a data storage section 1000 and output to the control section 114 at a predetermined timing. The security functions in the monitoring section 112 can be selectively set by the security function information storage section 1120 and the function setting section 1116 described later. The monitoring section 112 has a first monitoring operation for monitoring the security functions set by the function setting section 1116 and a second monitoring operation for monitoring the security functions not set by the function setting section 1116.

The security function information storage section 1120 stores information regarding various security functions to be attained in the monitoring section 112, and based on an instruction from the security function information selection section 2122, outputs the corresponding security function selection information to the function setting section 1116.

Based on the selection information, the function setting section 1116 sets the measurement functions and the security functions of the gas meter and outputs function setting signals to the flow rate computing section 110 and the monitoring section 112. A configuration may be used in which programs for attaining various measurement functions are stored in the flow rate computing section 110, and according to a function setting signal from the function setting section 1116, the corresponding function is operated, or another configuration may also be used in which the program of a measurement function stored in the security function information storage section 1120 and selected is read and input from the function setting section 1116 to the flow rate computing section 110 and then operated. Furthermore, a configuration may be used in which the programs for attaining various security functions are stored in the security function information storage section 1120, and according to a function setting signal from the function setting section 1116, the corresponding function is operated, or another configuration may also be used in which while the security function information is stored in the security function information storage section 1120, predetermined security function information is selected according to a security function selection signal transmitted from the monitoring center 200 via the communication section 124, and the program of the selected security function is read and input from the function setting section 1116 to the monitoring section 112 and then operated.

The security function information selection section 2122 has an interface function for inputting selection instructions for the measurement functions and the security functions to the security function information storage section 1120. The security function information selection section 2122 can input the selection signals transmitted from the monitoring center 200 via the network 500 and the communication section 124 to the security function information storage section 1120. Furthermore, similarly, the security function information selection section 2122 can input the selection signals transmitted from the terminal 600 via the network 500 and the communication section 124 to the security function information storage section 1120. Selection instructions can be input using not only wired communication from the monitoring center 200 or the terminal 600 but also various wireless communication units, such as wireless communication and infrared communication. Still further, the security function information selection section 2122 may be configured so as to have an operation input unit, for example, information processing equipment and terminals, such as operation buttons, a premise indicator and a personal computer, so that a user or a manager directly inputs instructions to input selection instructions. As described above, the security function information selection section 2122 is not limited to the above-mentioned one, and the input for the function selection can be attained using various methods.

The control section 114 shuts off the supply of gas or issues a notice to the monitoring center 200 based on a security signal from the monitoring section 112. In the case of shutting off the supply of gas, the shutoff valve 104 is operated to shut off the flow path 102. In the case of issuing a notice, the communication section 124 is instructed to communicate with the monitoring center 200 via the network 500, and a notice regarding the occurrence of a problem due to an unset function is sent to the monitoring center 200. At this time, the control section 114 shuts off the supply of gas in the case that a phenomenon satisfying an operation condition of a security function (set function) set in the function setting section 1116 has been detected by the first monitoring operation of the monitoring section 112. Furthermore, a warning notice may be issued to the monitoring center 200 in the case that a phenomenon satisfying an operation condition of a security function (unset function) not set in the function setting section 1116 has been detected by the second monitoring operation of the monitoring section 112. The notice to the monitoring center 200 is issued in the case that a problem that is judged using the second monitoring operation has occurred a predetermined number of times. This enhances the accuracy of detecting the situation of problem occurrence relating to gas supply and becomes data when the necessity of adding security functions is appealed to the user.

In the case that the monitoring center 200 has received a notice of a problem detected by the second monitoring operation from the gas meter 100, the monitoring center 200 issues, to the user, a notice indicating that problem detection using a security function not selected at present is done, thereby urging the user to set the corresponding security function. As the notice to the user, not only a notice via electronic mail using the network 500 but also a notice via a telephone line or a notice via a mobile communication network in the case that the terminal 600 is a mobile device, such as a mobile phone or a PHS, is used. Hence, improvement in the security functions is attained. Furthermore, the monitoring center 200 may transmit a setting instruction to the gas meter 100 via the network 500 to set an unset security function, the phenomenon corresponding to which has been detected.

Integration processes corresponding to various flow rate conditions are available as measurement functions, for example, the following functions. The results of these flow rate measurements can be utilized to reduce gas bill, etc.

(1) Ordinary integration function . . . integrating measured flow rate values (2) Integration function by time zone . . . integrating flow rate values by predetermined time zone and utilizing the integration to reduce or increase bill (3) Integration function by season . . . integrating flow rate values by predetermined season (by month, etc.) and utilizing the integration to reduce or increase bill (4) Integration function by appliance . . . integrating flow rate values by appliance used and utilizing the integration to reduce or increase bill (5) Integration function by function . . . integrating flow rate values by type of usage (heating, hot water supply, cooking, etc.) and utilizing the integration to reduce or increase bill In the case of performing integration by time zone and season, timer and calendar functions are necessary; in the case of performing integration by appliance and function, a meter having an appliance discrimination function and a usage type discrimination function is necessity as precondition.

At this time, in the case that the user does not perform function selection in particular, for example, in the case that an ordinary integration function is set to a default function as a default measurement mode and a function is selected, the selected measurement function becomes effective in addition to the ordinary integration function.

Functions for detecting phenomena of various problems due to excess of flow rate, excess of usage time, leakage detection, abnormal pressure, pulsation detection, operation of a seismoscope, operation of a warning device, etc. and for performing processes for security are available, and the following functions are available for the detection of problems, for example.

(1) Excess of total maximum flow rate . . . in the case that the total flow rate in a predetermined period has exceeded the standard flow rate (2) Excess of individual maximum flow rate . . . in the case that the change from the previous flow rate value is not more than a predetermined value each time the flow rate is measured (3) Excess of security duration . . . in the case that usage has been continued beyond the continuous usage allowable time stipulated by flow rate (4) Detection of pressure rise . . . in the case that it has been detected that the pressure value has risen by a predetermined value or more (5) Detection of pressure drop . . . in the case that it has been detected that the pressure value has lowered by a predetermined value or more (6) Detection of operation of a seismoscope . . . in the case that it has been detected that the seismoscope has operated due to the tremor of an earthquake or the like (7) Detection of minute leakage . . . in the case that a predetermined minute leakage flow rate has been detected for a predetermined number of days (8) Detection of pulsation . . . in the case that the change in flow rate or pressure not less than a predetermined value has been detected (9) Detection of operation of a warning device . . . in the case that it has been detected that various warning devices have operated At this time, in the case that the user does not perform function selection in particular, for example, in the case that the security function of excess of total maximum flow rate is set to a default function as a default security mode and a function is selected, the selected security function becomes effective. In addition, as described above, in the case that an alarm operation and a shutoff operation are available as processing operations to be performed when a problem has been detected by the security function and in the case that a problem has been detected by the selected and set function, the shutoff operation is performed.

The terminal 600 has a communication function for establishing connection to the network 500 using a communication protocol, such as TCP/IP, and communicates with the gas meter 100 to set the security functions. In the case that the terminal 600 sets the security functions for the gas meter 100, the terminal 600 accesses the server 400 and performs a process of paying the bill for a desired security function. At this time, the terminal 600 is required to use an application for purchasing the security function; the terminal 600 may get the application from a predetermined site before accessing the server 400 or may get it from the server 400 after accessing the server 400. In this embodiment, it is assumed that the terminal gets the application from the server 400.

In the case that the user of the terminal 600 is urged to additionally purchase a security function from the monitoring center 200 or in the case that the user intends to purchase a security function desired by himself or herself, the user uses the terminal 600 to access the server 400. Furthermore, the user purchases the required security function through the communication with the server 400, and then the user accesses the gas meter 100 and transmits a security function selection signal corresponding to the purchased security function. The communication section 124 of the gas meter 100 receives the security function selection signal transmitted from the terminal 600 and outputs the signal to the security function information selection section 2122. After receiving the security function selection signal, the security function information selection section 2122 selects appropriate information from among a plurality of security function information stored in the security function information storage section 1120. Then, this security function information is output to the function setting section 1116, and the corresponding program is set in the monitoring section 112. Hence, the monitoring section 112 monitors to detect a problem during the use of gas according to the newly set security function. The server 400 has a communication function for establishing connection to the network 500 using a communication protocol, such as TCP/IP, and supplies an application capable of setting the security function in the terminal 600 using this communication function. Furthermore, in the case that billing has occurred accompanied by security function setting at the terminal 600, the processing thereof is performed.

Figure 6:
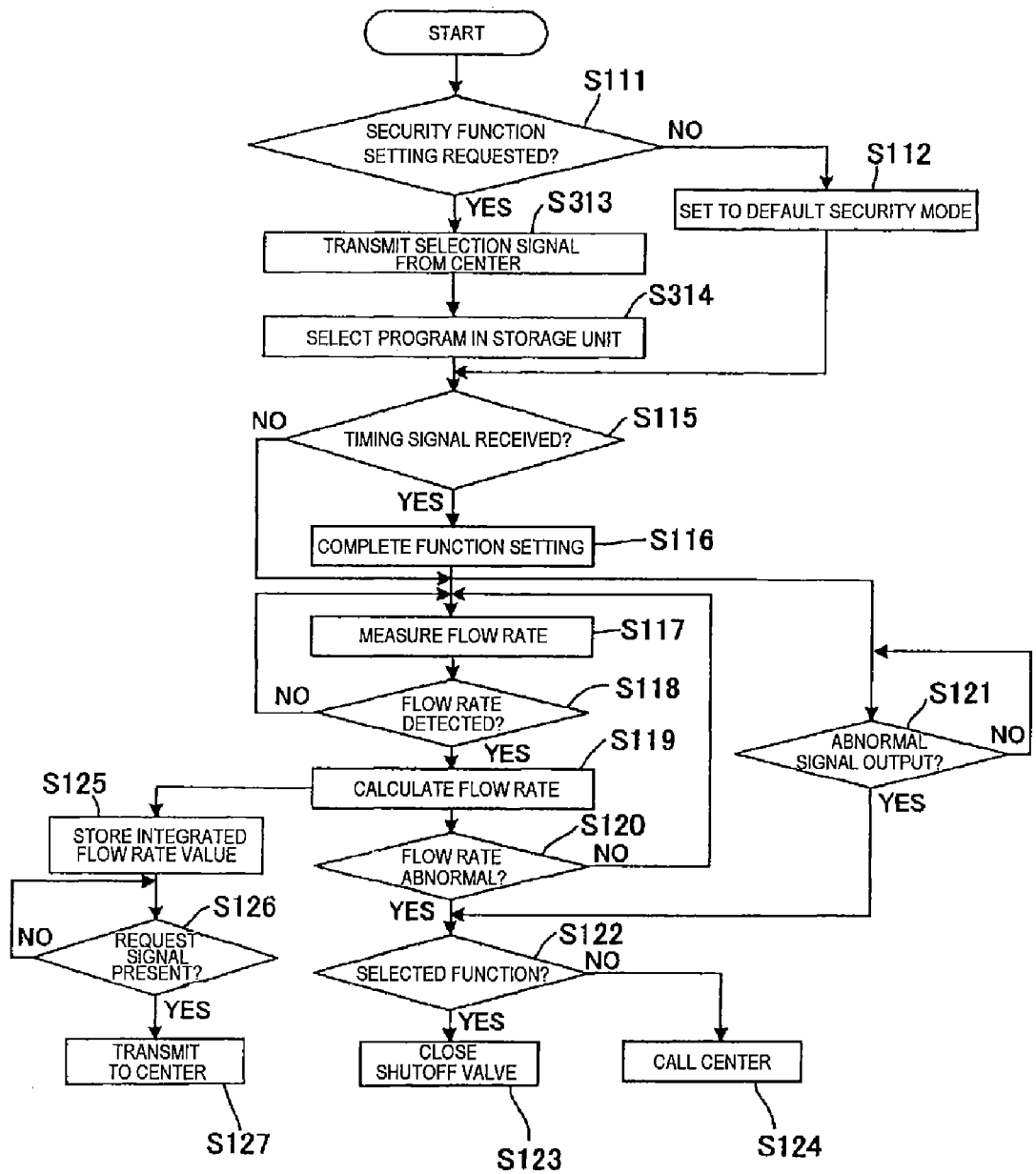
FIG. 6 is a flowchart showing a processing procedure during the operation of the gas meter and the gas security system according to Embodiment 3 of the present invention.

Next, the operations of the gas meter and the gas security system according to this embodiment will be described in detail. FIG. 6 is a flowchart showing a processing procedure during the operations of the gas meter and the gas security system according to this embodiment of the present invention.

First, the function setting section 1116 checks information received at the security function information selection section 2122 and judges whether security function setting is requested (at step S111). In the case that security function setting is requested at step S111, a security function selection signal is transmitted from the monitoring center 200 or the terminal 600 via the network 500 (at step S313), and predetermined security function information is selected from the security function information stored in the security function information storage section 1120 based on the security function selection signal (at step S314). Furthermore, a judgment is made as to whether a timing signal indicating that the security function information selection signal was sent from the monitoring center 200 or the terminal 600 via the network 500 has been received (at step S115), and the predetermined security function information from the security function information storage section 1120 is set (at step S116). On the other hand, in the case that security function setting is not requested at step S111 in which a judgment is made as to whether security function setting is requested, setting is done to the default security mode (for example, only the excess of total maximum flow rate) (at step S112), and the procedure advances to step S115. Function setting is completed by performing the security function setting (at step S116). The above-mentioned timing signal may be a timing signal indicating that meter reading has been performed or may be a timing signal indicating that bill has been withdrawn; at step S115, a judgment as to whether the security function information setting is switched to valid or invalid is done according to this timing signal.

Next, the flow rate of gas is measured by the flow rate measurement section 106 (at step S117). Then, a judgment is made as to whether the flow rate has been detected (at step S118), and in the case that the flow rate has been detected, the flow rate value is calculated using the flow rate computing section 110 (at step S119). In this flow rate value calculation, the integration of various flow rate values having been set as measurement functions is performed. Furthermore, in the case that no flow rate has been detected at step S118, the procedure returns to the flow rate measurement at step S117, and a similar process is repeated. Subsequently, after the flow rate value is calculated, the monitoring section 112 judges whether the flow rate is abnormal, such as the excess of flow rate (at step S120). In the case that the flow rate is abnormal at step S120, the procedure advances to the next step; in the case that there is no abnormality, the procedure returns to the flow rate measurement at step S117, and a similar process is repeated. Moreover, the monitoring section 112 judges whether an abnormal signal, such as a pressure detection signal from the pressure sensor 108, a seismic signal from the seismoscope 126 or an abnormality detection signal from the warning device 128, is output (at step S121). In the case that such an abnormal signal is output at step S121, the procedure advances to the next step; in the case that no abnormal signal is output, the procedure returns to the flow rate measurement at step S117, and a similar process is repeated.

Next, in the case that the flow rate is abnormal or in the case that an abnormal signal is output, the monitoring section 112 judges that a problem has occurred and outputs a security signal to the control section 114. When detecting a problem and outputting a security signal at this time, the monitoring section 112 judges not only the operation conditions of the above-mentioned selected and set security function but also the operation conditions of an unselected and unset security function; in the case that the operation conditions are satisfied, the monitoring section 112 transfers a security signal relating to the corresponding security function and information indicating the presence/absence of function setting to the control section 114. Then, the control section 114 judges whether the security function for which the security signal has been output is the above-mentioned set security function (at step S122). In the case that the security function is the set security function (at step S122), the shutoff valve 104 is operated and the flow path 102 is closed, thereby shutting off the supply of gas (the closing operation of the shutoff valve at step S123).

Furthermore, in the case that the security function is an unset security function at step S122, the control section 114 transmits a warning via the communication section 124 and gives the warning to the monitoring center 200 via the network 500 (at step S124). Hence, even with respect to a security function not selected by the user, in the case that a problem has been detected while the operation conditions are satisfied for a predetermined number of times, the monitoring center 200 can recognize the occurrence of the problem. In the case that the monitoring center 200 has received the notice of the occurrence of the problem from the gas meter 100, the monitoring center 200 issues, to the terminal 600 of the user via electronic mail or the like, a notice indicating the occurrence of the problem due to an unselected security function, thereby reporting the necessity of the setting of the corresponding security function and urging improvement in the security functions.

On the other hand, at the flow rate value calculation step S119, integration of various flow rate values having been set as measurement functions is performed, and this integrated value is stored in the data storage section 1000 (at step S125). Then, the monitoring section 112 judges whether a signal requesting the transmission of the integrated flow rate value is present or absent (at step S126). Furthermore, in the case that the request signal is present, an instruction signal is output from the monitoring section 112 to the control center 4, the control section 114 reads the predetermined integrated flow rate value from the data storage section 1000 and transmits the value to the monitoring center 200 via the communication section 124 (at step S127). Then, the monitoring center 200 outputs a bill withdrawal signal, etc.

Still further, in the case that the signal requesting the transmission is not detected at step S126, the procedure returns to the judgment step S126 and a similar process is repeated.

Figure 7:
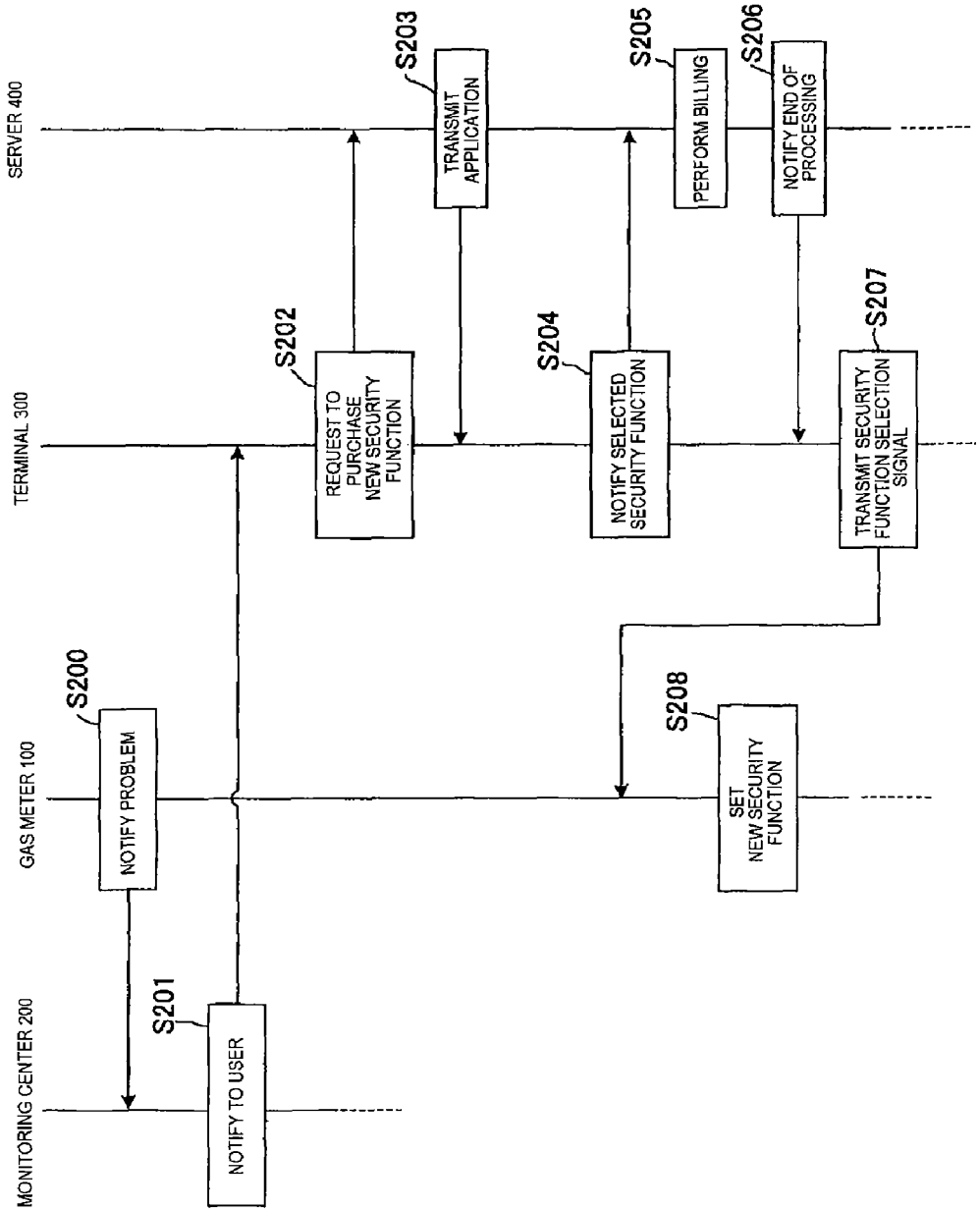
FIG. 7 is a sequence diagram illustrating a procedure for setting a new security function in the gas meter and the gas security system according to Embodiment 3 of the present invention.

Next, a procedure for setting a new security function in the gas meter and the gas security system according to this embodiment of the present invention will be described referring to a sequence diagram shown in FIG. 7.

In the gas meter 100, in the case that the control section 114 has detected a phenomenon satisfying an operation condition of a security function (unset function) not set in the function setting section 1116 using the second monitoring operation of the monitoring section 112, a notice of a problem is issued to the monitoring center 200 (at step 200). After receiving the notice of the problem detected by the second monitoring operation from the gas meter 100, the monitoring center 200 gives the notice to the terminal 600 of the user via electronic mail or the like (at step S201).

After receiving the notice from the monitoring center 200, the user accesses the server 400 using the terminal 600 and sends a request for purchasing a new security function (at step S202). When accessed from the terminal 600, the server 400 performs authentication; if the authentication is proper, the server transmits an application for purchasing security functions to the terminal 600 (at step S203). Upon receiving the application transmitted from the server 400, the terminal 600 starts operation according to the application and displays information for purchasing security functions on the display screen of the terminal 600. When the user looks at the display and selects a desired security function, the terminal 600 notifies the selected security function to the server 400 (at step S204). The server 400 performs billing processing for the security function notified from the terminal 600 (at step S205); after the processing is ended normally (more specifically, after withdrawal from credit card or the like is ended), the end of the processing is notified to the terminal 600 (at step S206).

After receiving the end of the processing from the server 400, the terminal 600 accesses the gas meter 100 and transmits a security function selection signal for selecting the security function purchased by the user (at step S207). Upon receiving the security function selection signal from the terminal 600, the gas meter 100 sets the new security function corresponding to the security function selection signal (at step S208). Hence, problems that may occur during the use of gas are monitored according to a plurality of security functions including the new security function.

As described above, with the above-mentioned embodiment, from the security function information stored in the gas meter 100, based on the security function selection signal that is input as necessary via the network 500 depending on usage environment, etc., security function information can be selected and set; in the case that a phenomenon corresponding to the set function has occurred, a security process for shutting off the supply of gas can be executed. With respect to an unset security function, in the case that a phenomenon corresponding to an unset function has occurred, the occurrence of a problem due to the unset function is recognized in the monitoring center 200 by giving a notice to the monitoring center 200 and then notified to the terminal 600 of the user of gas. Furthermore, the user of gas is prompted to set the corresponding security function using the terminal 600, whereby further improvement in the security functions can be attained.

It is possible that the security functions are set selectively from among a plurality of functions via the network 500 depending on the area of use, installation location, usage state, usage flow rate, etc. Furthermore, it is also possible easily to update the security functions by version upgrade, for example, and to add new security functions via the network 500.

Moreover, accidents may occur in rare cases even in a state in which almost all the security functions are incorporated in the gas meter 100, the possibility of accident occurrence relating to gas supply is very low and the security is ensured. In such cases, advanced security functions for preventing accidents occurring on rare occasions may be used as options and installed via the network 500, whereby the version of the gas meter can be upgraded.

Still further, it is assumed that the security functions are not provided in some usage areas. In the case of such areas, there is a possibility that demand for enhancing the security functions is generated in accordance with future infrastructure improvement, change in the feeling of the user who emphasizes security, change in national policy, etc. As initial countermeasures therefor, the security functions for preventing accident occurrence relating to gas supply are set selectively so that other security functions can be selected later according to the security function selection signals and so that billing is performed for the security functions, whereby the security of a gas supply system can be improved while the functions of the existing gas meter are enhanced.

Furthermore, the control section 114 of the above-mentioned gas meter 100 may issue the notice about the occurrence of the problem due to the unset function; when the notice is issued, the notice may be done in the case that a phenomenon satisfying an operation condition of the unset function has occurred a predetermined number of times. With this configuration, it is possible to improve the accuracy of detecting problem occurrence relating to gas supply.

In addition, in the above-mentioned gas meter system, programs for attaining various security functions are held in the gas meter 100 and selected using the monitoring center 200 and the terminal 600 (in other words, a security function selection signal is transmitted from the monitoring center 200 and the terminal 600 to the gas meter 100); however, the programs may be transmitted from the monitoring center 200 and the terminal 600 to the gas meter 100. In particular, in the case of performing the transmission from the terminal 600, the programs for attaining the various security functions are stored in the server 400, and the terminal 600 gets the corresponding program from the server 400 and transmits the program.

Furthermore, although it is configured that the above-mentioned server 400 provides the application for purchasing a security function to the terminal 600, the application may be made downloadable from the site of a gas company on the Internet, or may be supplied via a recording medium, such as a CD-ROM, or may be held in the terminal 600 at the time of factory shipment.

Still further, the present invention is not limited to the embodiments described above, but may be modified and applied by those skilled in the art based on the description of the specification and known technologies, and such modifications and applications are included within the scope of protection.

INDUSTRIAL APPLICABILITY

The present invention is useful in a gas meter, for measuring the flow rate of gas used, capable of supplying security function information as necessary via a communication line and setting security functions depending on usage environment, etc. and having an effect capable of improving security functions, and also useful in a gas security system or the like incorporating this gas meter.

The invention claimed is:

1. A gas meter comprising:
a flow rate measurement section that measures a flow rate of gas flowing through a gas flow path;
a flow rate computing section that calculates flow rate data based on flow rate measurement values measured by the flow rate measurement section;
a function setting section that sets operation conditions for conditioning occurrences of anomalies to trigger security functions regarding a use of gas;
a monitoring section that monitors, during the use of gas, an occurrence of any anomaly which is conditioned by one of operation conditions including said operation conditions set by the function setting section;
a control section that initiates the security functions when an occurrence of an anomaly is detected by the monitoring section; and
a communication section instructed by the control section to communicate with a monitoring center for managing a supply of gas, wherein
said function setting section receives security function information indicative of a new operation condition which is transmitted from the monitoring center via the communication section and sets the new operation condition to condition an occurrence of an anomaly, and
the security functions initiated by the control section comprises shutting off the supply of gas.

2. The gas meter according to claim 1, further comprising:
a security function information storage section that stores operation conditions received via the communication section, wherein
the function setting section selects an operation condition from the operation conditions stored in the security function information storage section.

3. The gas meter according to claim 1, wherein
the function setting section sets operation conditions for conditioning an occurrence of anomalies comprising an abnormally large flow rate, an abnormally long usage time, a leakage detection, an abnormal pressure, a pulsation detection, an operation of a seismoscope and an operation of a warning device.

4. A gas security system comprising the gas meter of claim 1 and a monitoring center which is connected to the gas meter via a communication line to receive notices from the gas meter.

5. A gas meter comprising:
a flow rate measurement section that measures a flow rate of gas flowing through a gas flow path;
a flow rate computing section that calculates flow rate data based on flow rate measurement values measured by the flow rate measurement section;
a function setting section that sets operation conditions for conditioning occurrences of anomalies to trigger security functions regarding a use of gas;
a security function information storage section that stores the operation conditions;
a monitoring section that monitors, during the use of gas, an occurrence of any anomaly which is conditioned by one of operation conditions including said operation conditions set by the function setting section;
a control section that indicates the security functions when an occurrence of an anomaly is detected by the monitoring section, and
a communication section instructed by the control section to communicate with a monitoring center for managing a supply of gas, wherein
the function setting section receives a selection signal transmitted from the monitoring center via the communication section and selects, based on the received selection signal, an operation condition from the operation conditions stored in the security function information storage section and sets the selected operation condition, and
the security functions initiated by the control section comprises shutting off the supply of gas.

6. The gas meter according to claim 5, wherein
the function setting section selects, based on the received selection signal, an operation condition from the operation conditions stored in the security function information storage section.

7. The gas meter according to claim 5, wherein
operation conditions for conditioning an occurrence of anomalies are received via the communication section and stored in the security function information storage, and
the function setting section selects, based on the received selection signal, an operation condition from the operation conditions stored in the security function information storage section.

8. The gas meter according to claim 5, wherein
the function setting section sets, operation conditions for conditioning an occurrence of anomalies comprising an abnormally large flow rate, an abnormally long usage time, a leakage detection, an abnormal pressure, a pulsation detection, an operation of a seismoscope and an operation of a warning device.

9. A gas security system comprising the gas meter of claim 5 and a monitoring which is center connected to the gas meter via a communication line to receive notices from the gas meter.

10. A gas meter comprising:
a flow rate measurement section that measures a flow rate of gas flowing through a gas flow path;
a flow rate computing section that calculates flow rate data based on flow rate measurement values measured by the flow rate measurement section;
a function setting section that sets operation conditions for conditioning occurrences of anomalies to trigger security functions regarding a use of gas;
a security function information storage section that stores operation conditions regarding the use of gas,
a monitoring section that monitors, during the use of gas, an occurrence of any anomaly which is conditioned by one of operation conditions including said operation conditions set by the function setting section,
a control section that initiates the security functions when an occurrence of an anomaly is detected by the monitoring section, and
a communication section that communicates with a terminal possessed by a user of gas, wherein
the function setting section receives a selection signal transmitted from the terminal via the communication section and selects, based on the received selection signal, an operation condition from the operation conditions stored in the security function information storage section and set the selected operation condition, and
the security functions initiated by the control section comprise shutting off the supply of gas.

11. The gas meter according to claim 10, wherein the function setting section sets operation conditions for conditioning an occurrence of anomalies comprising an abnormally large flow rate, an abnormally long usage time, a leakage detection, an abnormal pressure, a pulsation detection, an operation of a seismoscope and an operation of a warning device.

12. A gas security system comprising the gas meter of claim 10 and a terminal which is connected to the gas meter via a network to transmit a selection signal for selecting an operation condition selected by the user of gas from among a plurality of operation conditions regarding the use of gas to said gas meter.

* * * * *

UNITED STATES PATENT AND TRADEMARK OFFICE
CERTIFICATE OF CORRECTION

PATENT NO. : 8,250,932 B2  
APPLICATION NO. : 12/921359  
DATED : August 28, 2012  
INVENTOR(S) : Yokohata et al.

Page 1 of 1

It is certified that error appears in the above-identified patent and that said Letters Patent is hereby corrected as shown below:

On the Title Page

Item [73], immediately after "Osaka (JP)" insert --; The High Pressure Gas Safety Institute, Tokyo (JP)--.

Signed and Sealed this  
Second Day of December, 2014

Michelle K. Lee  
*Deputy Director of the United States Patent and Trademark Office*